(12) United States Patent
Chung

(10) Patent No.: US 11,960,105 B2
(45) Date of Patent: Apr. 16, 2024

(54) PENTILE METHOD STEREOSCOPIC DISPLAY AND SYSTEM

(71) Applicant: Hyunin Chung, Seoul (KR)

(72) Inventor: Hyunin Chung, Seoul (KR)

( * ) Notice: Subject to any disclaimer, the term of this patent is extended or adjusted under 35 U.S.C. 154(b) by 0 days.

(21) Appl. No.: 18/298,422

(22) Filed: Apr. 11, 2023

(65) Prior Publication Data

US 2023/0350221 A1  Nov. 2, 2023

(30) Foreign Application Priority Data

Apr. 28, 2022 (KR) .................. 10-2022-0052593

(51) Int. Cl.
*G02B 30/32* (2020.01)
*G09G 3/20* (2006.01)

(52) U.S. Cl.
CPC .......... *G02B 30/32* (2020.01); *G09G 3/2003* (2013.01); *G09G 2300/0452* (2013.01)

(58) Field of Classification Search
CPC ................ G02B 30/32; G09G 3/2003; G09G 2300/0452
USPC ............................................... 348/51
See application file for complete search history.

(56) References Cited

U.S. PATENT DOCUMENTS

| | | | | |
|---|---|---|---|---|
| 2012/0182407 A1* | 7/2012 | Yoshida | ........ | G03B 35/18 348/54 |
| 2013/0182319 A1* | 7/2013 | Chung | ........ | G02B 30/27 359/463 |
| 2014/0029094 A1* | 1/2014 | Kroon | ........ | H04N 13/324 359/463 |
| 2014/0132726 A1* | 5/2014 | Jung | ........ | H04N 13/351 348/46 |
| 2014/0204078 A1* | 7/2014 | Chen | ........ | H04N 13/376 345/419 |
| 2015/0015679 A1* | 1/2015 | Lee | ........ | H04N 13/305 348/51 |
| 2015/0334368 A1* | 11/2015 | Odake | ........ | H04N 13/271 348/43 |
| 2017/0309215 A1* | 10/2017 | Perdices-Gonzalez | ........ | G09G 3/32 |
| 2018/0188441 A1* | 7/2018 | Fattal | ........ | G02B 30/27 |
| 2019/0058874 A1* | 2/2019 | Kim | ........ | H04N 13/398 |

FOREIGN PATENT DOCUMENTS

| KR | 20070073807 A | 7/2007 |
|---|---|---|
| KR | 100752336 B1 | 8/2007 |
| KR | 10-2008-0029401 A | 4/2008 |
| KR | 10-2012-0039712 A | 4/2012 |
| KR | 10-2013-0067430 A | 6/2013 |
| KR | 101476884 B1 | 12/2014 |
| KR | 10-2015-0145160 A | 12/2015 |

(Continued)

*Primary Examiner* — James T Boylan
(74) *Attorney, Agent, or Firm* — NKL LAW; Jae Youn Kim

(57) ABSTRACT

Provided herein is a stereoscopic display device including: a display layer for displaying multi-view images having at least three viewpoints into stereoscopic images; a transparent layer arranged on one side of the display layer; and a parallax barrier layer arranged on one side of the transparent layer and including a light blocking part for blocking light and a slit for transmitting light, wherein a pixel structure of the display layer is an RG-BG pentile subpixel structure or an RG-BW pentile subpixel structure.

6 Claims, 17 Drawing Sheets

(56) References Cited

FOREIGN PATENT DOCUMENTS

| KR | 1020160143066 A | 12/2016 |
| KR | 101971994 B1 | 4/2019 |
| KR | 10-2022-0013416 A | 2/2022 |

\* cited by examiner

| | |
|---|---|
| Original image | 입체연구소 |
| 26.565 degree/ five viewpoints | 입체연구소 |
| 26.565 degree/ six viewpoints | 입체연구소 |
| 18.435 degree/ six viewpoints | 입체연구소 |
| 11.31 degree/ six viewpoints | 입체연구소 |
| 8.13 degree/ six viewpoints | 입체연구소 |
| Vertical/ six viewpoints | 입체연구소 |

FIG. 14

PENTILE METHOD STEREOSCOPIC DISPLAY AND SYSTEM

BACKGROUND OF THE INVENTION

Field of the Invention

The present invention relates to a parallax barrier stereoscopic display device, which is applied to a 'pentile display', and manufacturing system thereof.

Background Art

A conventional stereoscopic technology was developed for the purpose of being applied to large monitors, such as TVs, or electronic display boards rather than small ones, so it lacked in exquisiteness. Recently, high resolution display devices, such as mobile phones, adopt mainly pentile organic light emitting diodes (OLEDs), so they need a smaller and more precise configuration type.

PATENT LITERATURE

Patent Documents

Patent Document 1: Korean Patent Application No. 10-2005-0127631 entitled "Parallax barrier type stereoscopic display device"
Patent Document 2: Korean Patent Application No. 10-2007-7009230 entitled "Composite dual LCD panel display suitable for three-dimensional imaging"
Patent Document 3: Korean Patent Application No. 10-2012-0067567 entitled "Parallax barrier type stereoscopic image display device"
Patent Document 4: Korean Patent Application No. 10-2018-0120956 entitled "Parallax barrier and stereoscopic display device including the same"

SUMMARY OF THE INVENTION

A conventional stereoscopic technology was developed for the purpose of being applied to large monitors, such as TVs, or electronic display boards rather than small ones, so it lacked in exquisiteness. Recently, high resolution display devices, such as mobile phones, adopt mainly pentile organic light emitting diodes (OLEDs), so they need a smaller and more precise configuration type.

First, according to the changed trend of small-sized high resolution displays, such pentile type high resolution display devices have a disadvantage in that the moire phenomenon is severely caused unlike the conventional method (RGB stripe arrangement) due to the changed structural characteristics such as pentile subpixels.

Second, it is difficult to find accurate angle and area of a slit so that the moire phenomenon does not occur in observation of stereoscopic images since the pentile structure is not uniform in form, configuration, and arrangement of subpixels.

Third, when observing a precise display such as a mobile phone at a close range, the resolution of a stereoscopic image is deteriorated, that is, the ratchet phenomenon that hinders the resolution in the case of small characters or objects requiring reading capability.

Fourth, in order to watch stereoscopic images, a user must often mount a parallax barrier device on a mobile phone and adjust it to a specific angle, but it is very difficult and cumbersome to adjust to a precise position.

To accomplish the above object, according to the present invention, there is provided a stereoscopic display device including: a display layer for displaying multi-view images having at least three viewpoints into stereoscopic images; a transparent layer arranged on one side of the display layer; and a parallax barrier layer arranged on one side of the transparent layer and including a light blocking part for blocking light and a slit for transmitting light, wherein a pixel structure of the display layer is an RG-BG pentile subpixel structure or an RG-BW pentile subpixel structure.

A horizontal interval of the slit of the parallax barrier layer satisfies the following Equation 1: <Equation 1> $S=a[(d-g)/d]$, wherein in the Equation 1, d is a distance from the display layer to a human eye, g is a distance between the display layer and the parallax barrier, a is ½ horizontal pitch of an R(red) element forming one pixel unit in the stereoscopic image, and S is a horizontal interval (width) of the slit of the parallax barrier layer.

The number of multi-viewpoints of the multi-view image displayed on the display layer satisfies the following Equation 2: <Equation 2> $e=a[(d-g)/g]$, that is, $q≈65$ mm/e, wherein in the Equation 2, d is a distance from the display layer and a human eye, g is a distance between the display layer and the parallax barrier, a is ½ horizontal pitch of a R(red) element forming one pixel unit in the stereoscopic image, e is a width of the horizontal view field that can be seen through compared to the size of one unit element (based on one eye), and q is the required number of multi-viewpoints (rounding up to the nearest decimal point).

In a case in which the pixel structure of the display layer is the RG-BG pentile subpixel structure, an angle of the slit of the parallax barrier layer satisfies the following Equation 3: <Equation 3> $\theta 1 = \arctan[a/(N1*b)]*180/\pi$, wherein in the Equation 3, θ1 means an angle between the slit and a line vertically connecting the RGB subpixels in the pixel arrangement of the display layer, a is ½ horizontal pitch of a R(red) element forming one pixel unit in the stereoscopic image, b is ½ vertical pitch of an R(red) element forming one pixel unit of the stereoscopic image, and N1 is a natural number of 2 or more, namely, an integer less than or equal to the number of multi-points.

In a case in which the pixel structure of the display layer is the RG-BW pentile subpixel structure, an angle of the slit of the parallax barrier layer satisfies the following Equation 4: <Equation 4> $\theta 2 = \arctan[a/(2\ N2*b)]*180/\pi$, wherein in the Equation 4, θ1 means an angle between the slit and a line vertically connecting the RGB subpixels in the pixel arrangement of the display layer, a is ½ horizontal pitch of a R(red) element forming one pixel unit in the stereoscopic image, b is ½ vertical pitch of an R(red) element forming one pixel unit of the stereoscopic image, and N2 is a natural number of 2 or more, namely, an integer less than or equal to the number of multi-points.

The parallax barrier layer includes a switchable parallax barrier which is switched into the light blocking part and the slit depending on an electric signal.

The stereoscopic images displayed on the display layer are sets of multi-view images repeatedly arranged, and each of the sets of multi-view images has at least one a image.

The α image is one among a monochromatic image, a translucent image, a gradation image, and an image adjacent to the sets of multi-view images.

In another aspect of the present invention, there is provided a mobile phone case provided on a mobile phone for allowing a user to see a stereoscopic screen, including: a lower frame coupled to face a display of the mobile phone; an upper frame coupled to the lower frame via a hinge; and a parallax barrier film coupled to the upper frame, wherein the parallax barrier film includes a light blocking part for blocking light and a slit for transmitting light. A horizontal interval of the slit of the parallax barrier film satisfies the following Equation 5: <Equation 5> S=a[(d−g)/d], wherein in the Equation 5, d is a distance from the display layer to a human eye, g is a distance between the display layer and the parallax barrier, a is ½ horizontal pitch of an R(red) element forming one pixel unit in the stereoscopic image displayed on the display, and S is a horizontal interval (width) of the slit of the parallax barrier film.

In another aspect of the present invention, there is provided a mobile phone case provided on a mobile phone for allowing a user to see a stereoscopic screen, including: a frame coupled to a display of the mobile phone; and a parallax barrier film disposed on one side of the frame, wherein the parallax barrier film includes a light blocking part for blocking light and a slit for transmitting light. A horizontal interval of the slit of the parallax barrier film satisfies the following Equation 6: <Equation 6> S=a[(d−g)/d], wherein in the Equation 6, d is a distance from the display layer to a human eye, g is a distance between the display layer and the parallax barrier, a is ½ horizontal pitch of an R(red) element forming one pixel unit in the stereoscopic image displayed on the display, and S is a horizontal interval (width) of the slit of the parallax barrier film.

In another aspect of the present invention, there is provided a parallax barrier film arranged to face a display of a mobile phone for allowing a user to see a stereoscopic screen, including: a light blocking part for blocking light and a slit for transmitting light. A horizontal interval of the slit satisfies the following Equation 7: <Equation 7> S=a[(d−g)/d], wherein in the Equation 7, d is a distance from the display layer to a human eye, g is a distance between the display layer and the parallax barrier, a is W horizontal pitch of an R(red) element forming one pixel unit in the stereoscopic image displayed on the display, and S is a horizontal interval (width) of the slit of the parallax barrier film.

The present invention has advantages as a portable stereoscopic image display device to solve the problems of the conventional arts. That is, the present invention provides a parallax barrier system capable of observing stereoscopic images in a personal portable device, such as a mobile phone, prevents the moire phenomenon by accurately providing the angle and the area of the parallax barrier slit in the pentile display device, allows a user to watch clear stereoscopic images by securing a stereoscopic cognitive angle of view at a short distance that the user holds and watches the personal device with hand, and provides a parallax barrier system allowing the user to selectively watch two-dimensional images and three-dimensional images.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIG. 14 is an enlarged comparative view illustrating a stereoscopic image and changed images according to inclination angles of a slit of the stereoscopic image display device according to an embodiment of the present invention;

DETAILED DESCRIPTION OF THE PREFERRED EMBODIMENT

A method for observing stereoscopic images without wearing glasses or a VR headset is called a glasses-free stereoscopic method. In order to develop such a method for commercial purposes, it will be essentially considered to select the most effective stereoscopic method and apply an effective method of producing and displaying stereoscopic images.

However, since conventional arts have been developed for the purpose of using large-sized monitors, such as TVs. or display panels for advertisement, there is a problem in that it is difficult to apply to small display devices, such as mobile phones.

The reason is that the conventional arts have difficulty in displaying clear stereoscopic images and in commercialization since the small display panels are being replaced with OLED panels in recent years and the arrangement of subpixel light emitting elements (RGB) is completely changed.

Therefore, the present invention is to solve the problems in consideration of the afore-mentioned problems to be developed.

Figure 1:
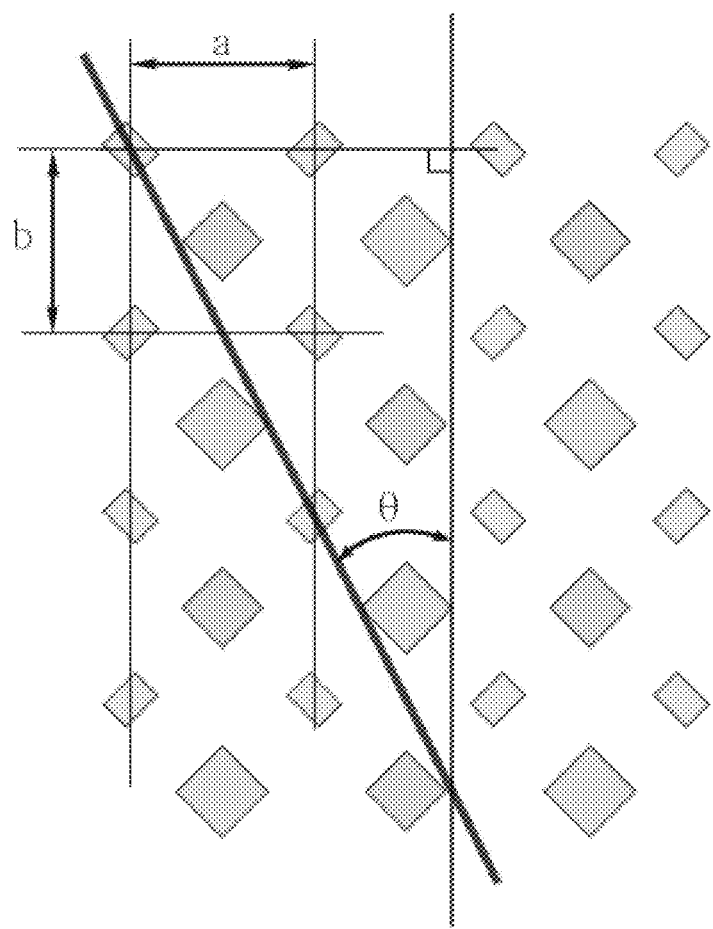
FIG. 1 is a diagram illustrating an angle of a slit to minimize the moire phenomenon in a pentile display panel according to an embodiment of the present invention.
Figure 2A:
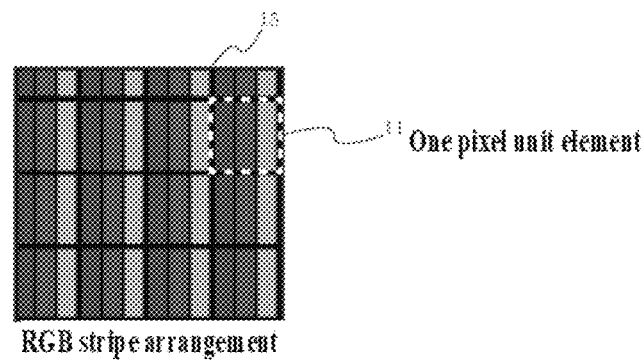
FIGS. 2A-2E are diagrams illustrating a conventional RGB stripe arrangement type and a pentile type in an element configuration of the display panel according to the present invention.
Figure 2B:
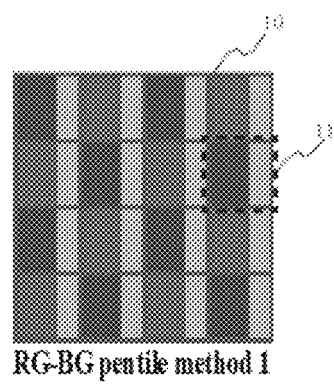
Figure 2C:
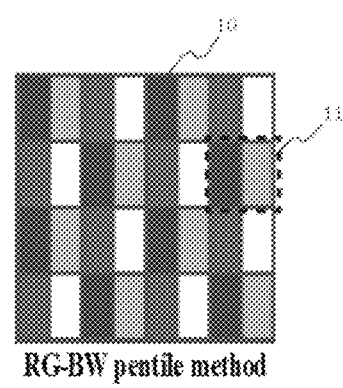
Figure 2D:
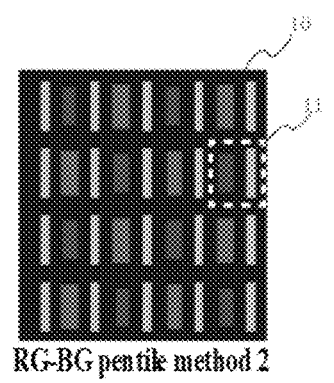
Figure 2E:
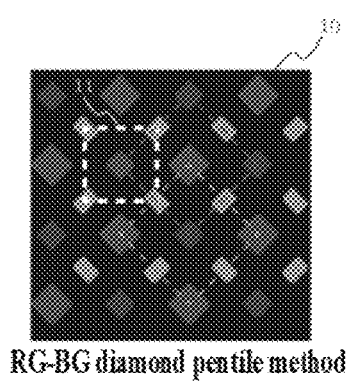
Figure 3:
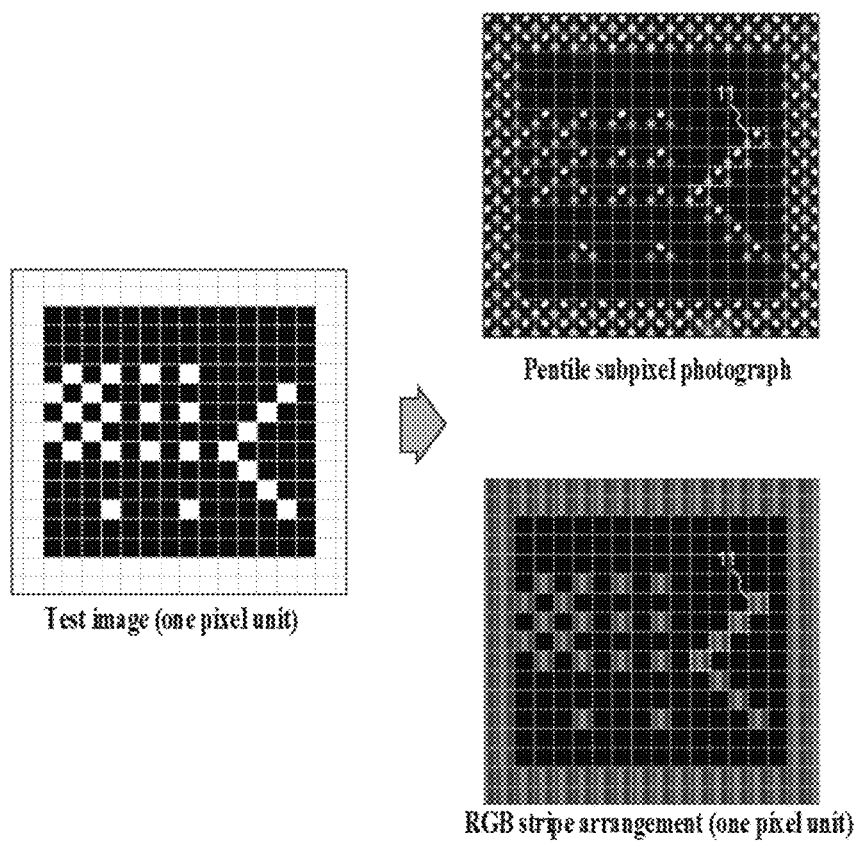
FIG. 3 is an enlarged comparative view of a photograph of the display panel according to an embodiment of the present invention.

FIGS. 1 to 3 show structural characteristics of a pentile display according to an embodiment of the present invention and the reason why the moire phenomenon inevitably occurs according to a pattern type of a parallax barrier disposed thereon.

In displaying one pixel of stereoscopic image data on a panel element, as illustrated in FIGS. 2A-2E, the 'RGB stripe arrangement method' according to the conventional art can clearly distinguish a pixel unit element 1/ since RGB subpixels are distributed on a predetermined area. However, the pentile structure does not show how to clearly distinguish one unit element in the display panel since having different area distribution and color arrangement.

Therefore, in various pentile methods, to distinguish and check each one pixel unit element 11 is to determine the 'pattern arrangement' of the parallax barrier for applying the stereoscopic (interlaced) images to the display panel. The method of preventing generation of the moire in the stereoscopic image perspective observation is to allow a user to watch clear stereoscopic images by the configuration method of a slit 33 and to be manufactured in consideration of the structural configuration method of the parallax barrier.

Pentile is mainly divided into an 'RG-BG method' and an 'RG-BW method', and one pixel unit element is not composed of three subpixels (RGB) but composed of only two subpixels.

That is, the rod cells that distinguish black and white and light and shade, among the retinal visual cells of human eyes, have quite high black and white resolution ability since having high density, but the cone cells that distinguish color senses is low have low color resolution ability since having low density, so the cone cells cannot distinguish colors with small pixels well. Using the weakness of the eyes, the pentile method has been developed based on the principle that human eyes are easily deceived even if only contrast is displayed in high resolution and color is displayed in low resolution.

In addition, since green occupies more than 70% of the elements that human eyes perceive the brightness of pixels (red occupies 20%, and blue occupies the rest), even if the size of green (G) pixels is reduced to half the size of red (R) and blue (B) subpixels and equally put to the two pixels, human perceive it as pixel brightness similar to white.

Therefore, as illustrated in FIGS. 2A-2E, in the 'RG-BG pentile method 1'. 'red (R) and green (G)' subpixels form one pixel unit element 11, and 'blue (B) and green (G)' subpixels form one pixel unit element 11, so the two pixel unit elements 11 are in a continuous arrangement.

In the 'RG-BW pentile' method, 'red (R) and green (G)' subpixels form one pixel unit element 11, and 'blue (B) and white(W)' subpixels form one pixel unit element 11, so the two pixel unit elements 11 are in a continuous arrangement.

However, as the small display technology has been developed further, the 'RG-BG pentile' method also has been changed in structural form. The structural form of the 'RG-BG pentile' method is divided into two styles of an 'RG-BG pentile method 2' and an 'RG-BG diamond pentile method'.

The 'RG-BG pentile method 2' is an arrangement method that OLEDs are applied in earnest, and is similar to the 'RG-BG pentile method 1' but is different from the 'RG-BG pentile method 1' in thickness and size of RGB subpixels.

In addition, in the case of the 'RG-BG diamond pentile method', the size and arrangement of elements are rearranged to have uniform interval and distribution due to the application of OLEDs. Since the number of subpixels in the 'pentile arrangement' is ⅔ smaller than that in the 'RGB stripe arrangement' in the case of an area with the same resolution, the pentile arrangement is advantageous in high resolution expression. In the case of the same resolution (PPI) in the same area, since the number of subpixels in the 'pentile arrangement' is 60 when the number of subpixels in the 'RGB stripe arrangement' is 90 (the number of all RGB subpixels), the pentile arrangement has a merit to have a spatial margin capable of raise resolution to higher resolution (LED density).

FIG. 3 is a photograph taken by experimenting how a test image is applied and displayed on each panel. (The horizontal and vertical mesh lines in the photograph are inserted randomly to help understanding of the pixel unit.)

Therefore, the 'test image' at the left side of the drawing is a black and white image produced in one pixel unit based on the display resolution, and one white dot is one pixel. Additionally, two images at the right side of the drawing are to compare the 'RG-BG diamond pentile' structure and the 'RGB stripe arrangement' structure.

As a result, it can be clearly seen that one set of the RGB subpixels forms one pixel unit in the 'RGB stripe arrangement' structure, but one white pixel of the test image has one green (G) element, half of a red (R) element, and half of a blue (B) element in the pentile structure. In other words, each green (G) element is located in one pixel unit, but since red (R) and blue (B) subpixels are adjusted by brightness, in a case in which brightness is 50%, the red (R) and blue (B) subpixels are applied to a light source of one pixel, and in a case in which brightness is 50% or more, the red (R) and blue (B) light sources are applied to two neighboring pixels which have the other half of red (R) and the other half of blue (B).

Figure 4:
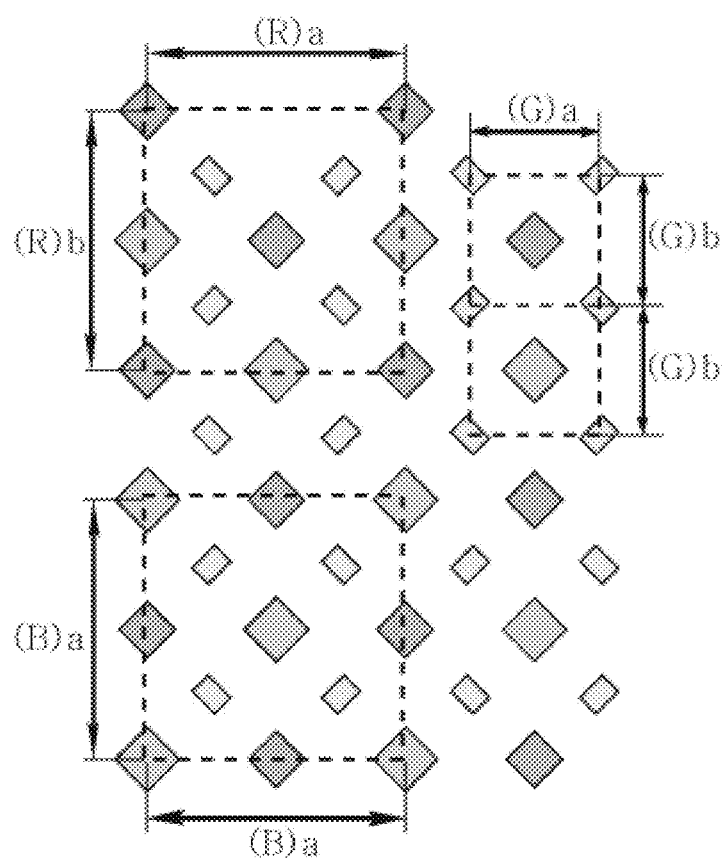
FIG. 4 is a view illustrating an arrangement of pentile subpixels according to an embodiment of the present invention.
Figure 5:
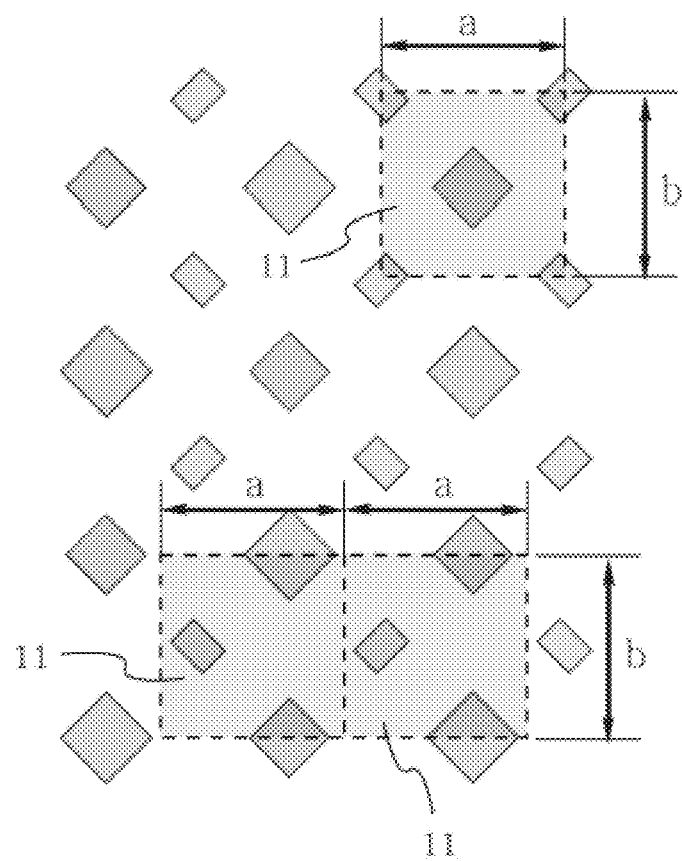
FIG. 5 is a view illustrating division of one element of a pixel unit element according to an embodiment of the present invention.

That is, as illustrated in FIG. 5 in FIG. 4, it can be seen that one set consisting of one blue (B)+one red (R)+two green (G) subpixels is divided into two pixel units. Finally, a horizontal pitch (a) and a vertical pitch (b) of the green (G) element serve as a standard for the size of one pixel unit element 11.

Figure 6:
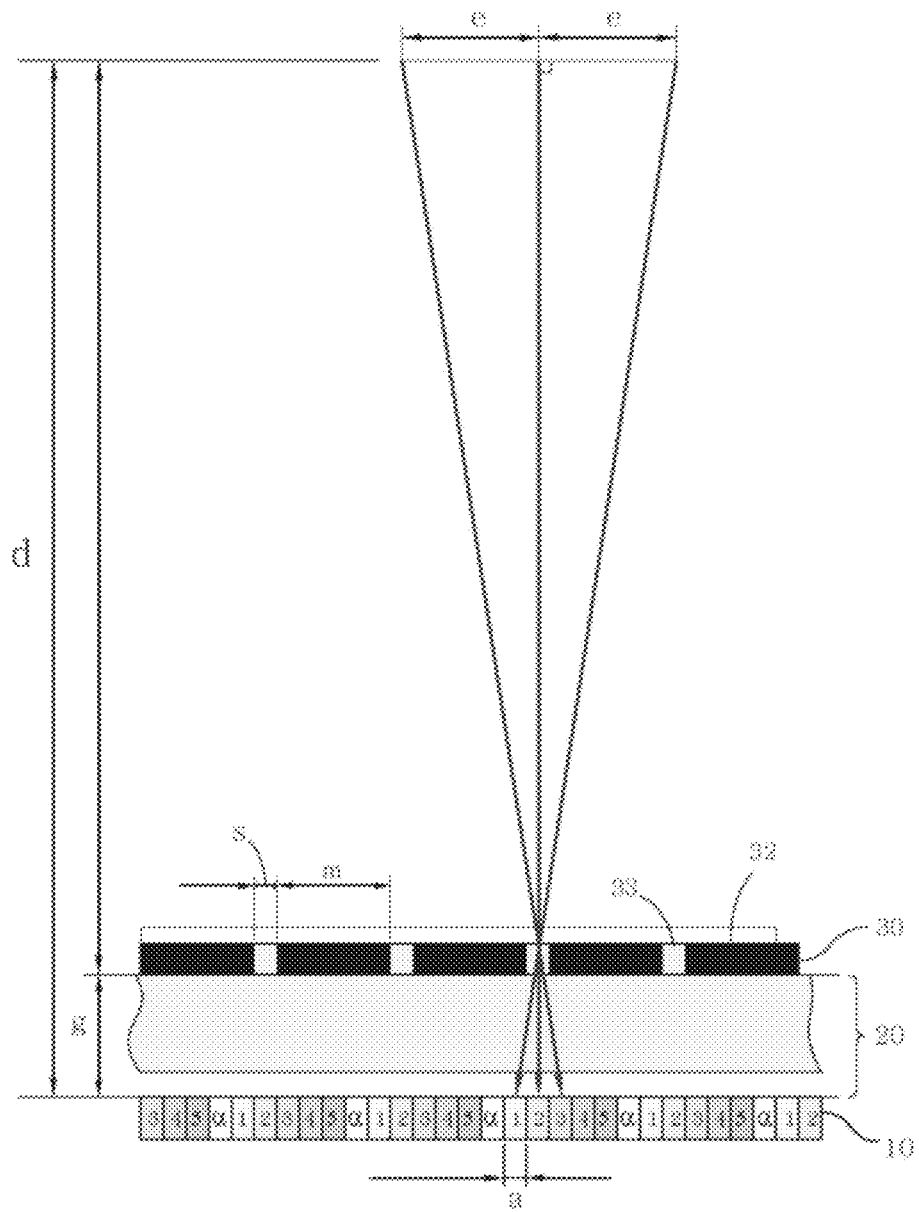
FIG. 6 is a cross-sectional view illustrating a stereoscopic image display device and a configuration method thereof according to an embodiment of the present invention.
Figure 7:
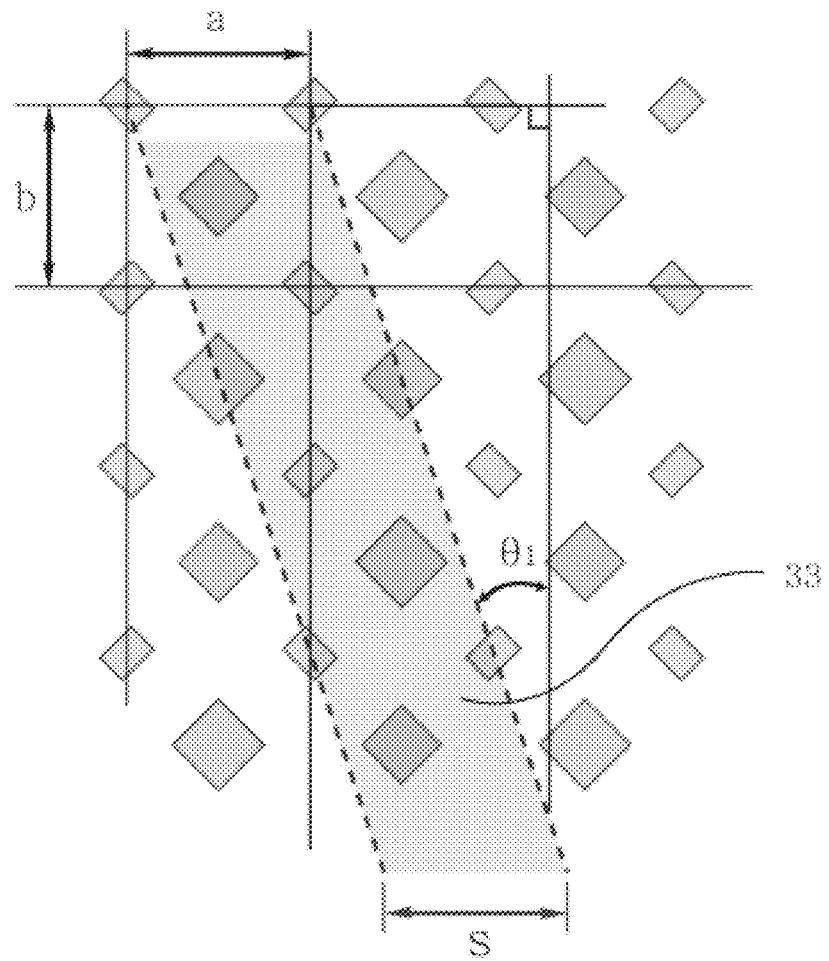
FIG. 7 is a view illustrating a configuration method of a parallax barrier slit applied to an RG-BG pentile panel according to an embodiment of the present invention.
Figure 8:
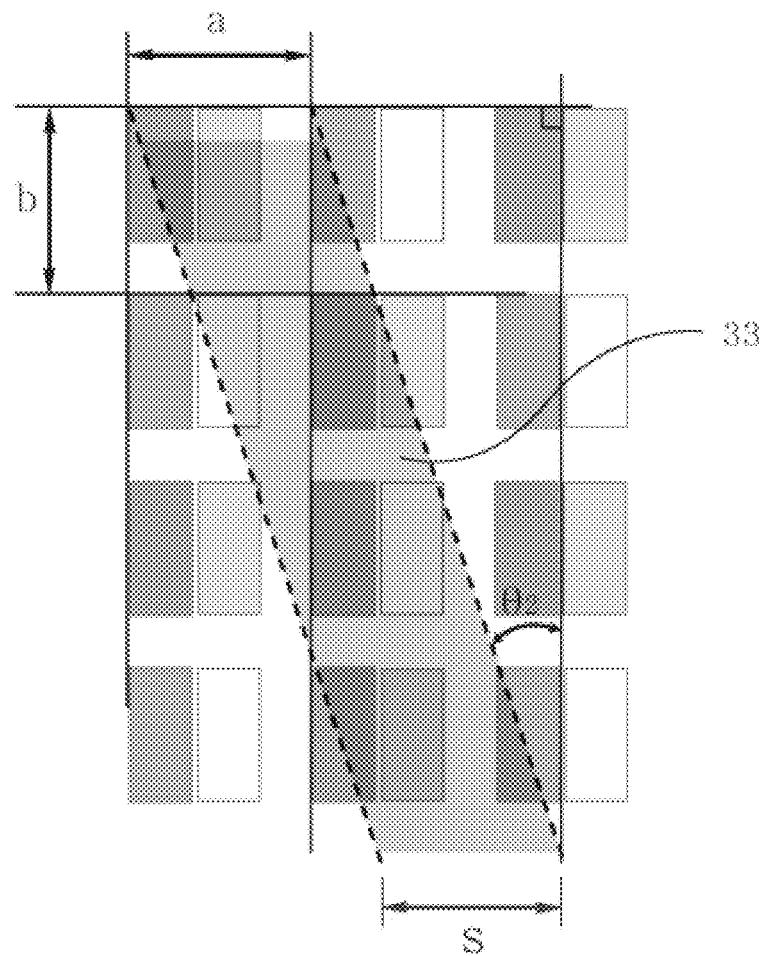
FIG. 8 is a view illustrating a configuration method of a slit applied to an RG-BW pentile panel according to an embodiment of the present invention.

FIGS. 6 to 8 are views illustrating a parallax barrier construction method of the present invention.

As illustrated in FIG. 6, in a case in which a stereoscopic image is displayed on a display layer 10, a parallax barrier layer 30 is formed at a constant distance, namely, at a distance g of a transparent layer 20.

On the display layer 10, the RGB elements are arranged in a pentile subpixel structure, and multi-view images are interlaced and displayed on a display panel as stereoscopic images. The display layer 10 illustrated in the drawing displays images interlaced in six viewpoints (1, 2, 3, 4, 5, and α), and it is illustrated that the size (a) of one pixel unit element is repeatedly arranged in the six viewpoints. However, it is preferable that the number of multi-viewpoints is three or more, but the present invention is not limited to the number.

The transparent layer 20 is a gap layer formed between the display layer 10 and the parallax barrier layers 30, is mainly made of a transparent material such as glass, a composite material, plastic, touch screen material, paint, ink, or a hollow state material according to a user's intention.

The parallax barrier layer 30 includes a light blocking part 32 and a light transmitting part 33, and has patterns with a certain angle and a certain interval.

In addition, the 'parallax barrier' may be made in the form of a film depending on the user's intention, but may be made in the form of a 'switchable barrier' as a 'liquid crystal (LCD) barrier screen'. In a case in which it looks transparent as a whole, the parallax barrier is mainly used when viewing general images (2D). A 'liquid crystal cell', which was transparent in a mask area, blocks light by electrical signals and is changed opaquely, so as to form the light blocking part 32. Of course, the remaining area becomes a slit area 33 so that stereoscopic (three-dimensional) images may be penetrated through the slit 33.

However, as illustrated in FIG. 7, in the case of the display layer 10 having an RG (red and green)-BG (blue and green) pentile structure that looks complex, since each subpixel is not divided into constant unit pixel areas, when viewing through the slit 33, a severe color change moire phenomenon as well as the stereoscopic images may be found.

The reason is that the RG (red and green)-BG (blue and green) subpixel arrangement is not the vertical and horizontal arrangement like the conventional 'RGB stripe arrangement', but is the vertical and horizontal arrangement and a 45-degree cross arrangement, and has subpixels of different sizes.

This is, the slits 33 must be formed at intervals of about one pixel width (a), and the RGB subpixels which are three primary colors of light must be evenly arranged and emit light in order to obtain a desired color in an area section of the slits 33.

Therefore, a subpixel structure equally divided within the space of the slits 33 is required. According to the conventional art, subpixels can be easily divided by the 'equal area division method'. However, since high resolution OLEDs like mobile phones mainly adopt the pentile structure, subpixels are divided by the 'equal light source division method'.

However, the 'equal light source division method' of the 'pentile arrangement' makes users feel the moire phenomenon with naked eyes sensitively due to an error in comparison with the conventional 'RGB stripe arrangement' method. That is, the 'equal light source division method' is sensitively changed by an angle ($\theta$) and a width (s) of the slit being viewed. Because of a very narrow error range, in a case of getting out of the error range by an accurate value, the moire phenomenon occurs.

An accurate amount of light by subpixels must be transmitted through the slit area, but in a case in which the amount of light by neighboring subpixels is high or insufficient, extreme color conversion moire occurs. The 'RGB stripe arrangement' method according to the conventional art can utilize an advantage of inducing a brighter screen by slightly widening the slit width, and allows somewhat error range. However, a method of manufacturing the slits 33 by the 'pentile arrangement' has a very narrow error range.

Therefore, structural characteristics of the 'pentile arrangement' method will be described as follows.

In order to form the parallax barrier layer 30, it is important how 'one pixel unit area' and 'one pixel unit element' of a stereoscopic image is formed. Therefore, it is necessary to understand and apply the basic principles first.

As described above, the 'pentile method' allows the human brain to first perceive G (green) color light and the R (red) or B (blue) light source to affect the surrounding subpixels to produce colors, so that the amount of color light of the R and B elements can make a color difference centering around one G (green) subpixel. Therefore, the horizontal pitch (a) and the vertical pitch (b) of the G (green) subpixel element become the size of 'one pixel unit element'. However, considering the overall common standard of the pentile method, centering around the R (red) or B (blue), ½ of the horizontal pitch of the R (red) or B (blue) element arrangement becomes the size (a) of the 'one pixel unit element'.

Therefore, in order to minimize the moire phenomenon that causes a color change, the slit 33 can be manufactured in an accurate horizontal width (S) and an accurate angle ($\theta$) of the slit by the following equation. Here, the angle ($\theta$) of the slit may mean an angle between a line vertically connecting RGB(W) subpixels in the pixel arrangement of the display layer and the slit.

The horizontal width (S) of the slit 33 can be obtained by the following equation:

$S/(d-g)=a/d$, namely, $$S=(d-g)a/d. \qquad \text{Equation 1}$$

('d' is a distance from the display element to a human eye,
'g' is a gap distance between the display element and the 'parallax barrier',
'a' is ½ horizontal pitch of the R(red) element forming one pixel unit in an image, and
'S' is a horizontal interval of the slit of the 'parallax barrier'.)

However, in a case in which a slope of the slit 33 of the parallax barrier pattern is formed in a vertical direction or in a horizontal direction, differently from the 'RGB stripe arrangement', the parallax barrier arrangement inevitably causes the severe color moire phenomenon. That is, G(green) color and purple (blue+red) color are alternately shown on the whole screen from any angle of the vertical angle and the horizontal angle, and it generates a negative effect that completely changes the screen color of the image.

Considering the vertical or horizontal arrangement in an aspect of characteristics of the pentile structure, since the vertical arrangement of the G(green) element and the vertical arrangement of the B(blue) and R(red) elements in the width of one pixel unit are viewed through the slit 33, the green color and the purple (blue+red) color are viewed on the entire screen by the moire phenomenon.

In the case of the 'RGB stripe arrangement' according to the prior art, there is no problem in colors viewed through the slit since colors of the RGB subpixels are distributed in equal area division within the area of the slit 33. However, the pentile display must be divided not by the 'equal area division' but by the 'equal light quantity division' since the RGB subpixels have different area sizes.

That is, within the slit area of the RGB subpixels, the correct color of the original image can be realized only when the light amount of the RGB subpixels is equally distributed and viewed. Therefore, the slope angle of the slit 33 is formed based on the 'equal light quantity division'.

However, the form of the slope is differently applied to the RG-BG pentile and the RG-BW pentile, and an equation to obtain an angle ($\theta 1$) of the RG-BG pentile type slit 33 is as follows:

$$\theta 1 = \arctan [a/(N1*b)]*180/\pi. \qquad \text{Equation 2}$$

(In the above equation, $\theta 1$ means a vertically tilted angle. 'a' is ½ horizontal pitch of the R(red) element forming one pixel unit in an image, 'b' is ½ vertical pitch of the R(red) element forming one pixel unit, and 'N1' is a natural number of 2 or more, namely, an integer less than or equal to the number of multi-points.)

In addition, in the RG-BW pentile method, an equation to obtain a slope angle (θ2) of the parallax barrier slit 33 is as follows:

$$\theta 2 = \arctan[a/(2N2*b)]*180/\pi \quad \text{Equation 3}$$

(In the above equation, θ2 means a vertically tilted angle, 'a' is ½ horizontal pitch of the R(red) element forming one pixel unit in an image, 'b' is ½ vertical pitch of the R(red) element forming one pixel unit, and 'N2' is a natural number, namely, an integer less than ½ the number of multi-points.)

Now, referring to FIG. 9, a slit construction method of the parallax barrier according to an embodiment of the present invention will be described as follows.

The horizontal interval (S) of the light transmitting part 33, namely, the slit 33, is determined by the functional relationship between a perspective distance (d) and a transparent layer distance (g) centered on the size of the 'one pixel unit element', a pattern having the slope according to the slit angle (θ) obtained by the above equation is formed at 'predetermined intervals', and the remaining pattern space becomes the light blocking portion 32 that blocks light.

By the way, the 'determined interval' refers to the pattern interval, namely, the 'horizontal pitch distance', of the 'parallax barrier'. That is, the 'determined interval' is:

slit interval (S)×number of multi-viewpoints=parallax Barrier pattern pitch.

The 'number of multi-viewpoints' means the number of images that are captured from multiple views and arranged on the screen by interlacing.

However, since a person sees stereoscopic images with both eyes, for example, if images taken from five viewpoints are prepared, the angle of view or gaze movement width to observe up to four stereoscopic images according to a viewing distance are determined.

It should be noted that the interval (S) of the slits 33 is inevitably changed according to the 'viewing distance' that a person watches with the naked eye, and it can be confirmed by the following table.

'Table 1' according to an embodiment of the present invention is obtained by applying mobile phones which are sold on the market, and is obtained by applying measurement values obtained by measuring the screen of the RG-BG pentile display panel by a microscope to the 'Equation 1'.

TABLE 1

(Unit: mm)

| d = perspective distance | g = transparent layer distance | a = pitch of G element | S = slit width |
|---|---|---|---|
| 290 | 1.15 | 0.0645 | 0.064244224 |
| 300 | | | 0.06425275 |
| 390 | | | 0.064309808 |
| 430 | | | 0.0643275 |
| 600 | | | 0.064376375 |
| 700 | | | 0.064394036 |

Therefore, in the case of a small display like a mobile phone, a 'main viewing distance', which a person holds the display with the hand to watch was measured in a range of about 30 cm to 70 cm. As a result, it is found that the slit interval continuously changes. Since an error distance is about 0.06425 mm to 0.06439 mm and an average value is about 0.06432 mm, the horizontal interval (S) of the parallax barrier slit according to the present invention is preferably about 0.06432 mm as a manufacturing value. After all, if a person watches out of the 'main viewing distance', a larger error will occur, so the color change moire phenomenon will increase more and more.

In addition, with respect to the method of constructing the slit 33, as illustrated in FIG. 8, the slope angle obtained by the 'Equation 3' is applied to the RG-BW pentile method, differently from the RG-BG pentile method.

The RG-BW pentile method has a structure in which two of each of subpixels of R(red), G(green), B(blue), and W(white) are included in the 'one pixel unit element'. Therefore, the size of 'one pixel unit element' is ½ the size of the repeated arrangement pitch of R(red), G(green) or B(blue), and W(white) subpixel elements, and has the horizontal size (a) and the vertical size (b) having the R(red), G(green) or B(blue), and W(white) colors as the 'one pixel unit element'.

Therefore, like the RG-BG pentile method, when being applied to the 'Equation 1', the horizontal interval (S) of the slit may be obtained. However, the method of obtaining the angle (θ) of the slit is varied. The uniform amount of light, that is, the 'equally divided light quantity' of the R(red), G(green), B(blue), and W(white) subpixels, must be penetrated through the slit so that the user can perceive accurate colors. Due to the structural characteristics of the RG-BW pentile arrangement method, an area and an angle capable of being equally divided are formed differently. Therefore, the slit angle (θ) of the RG-BW pentile method that minimizes the color change moire can be obtained by the 'Equation 3'.

Figure 9:
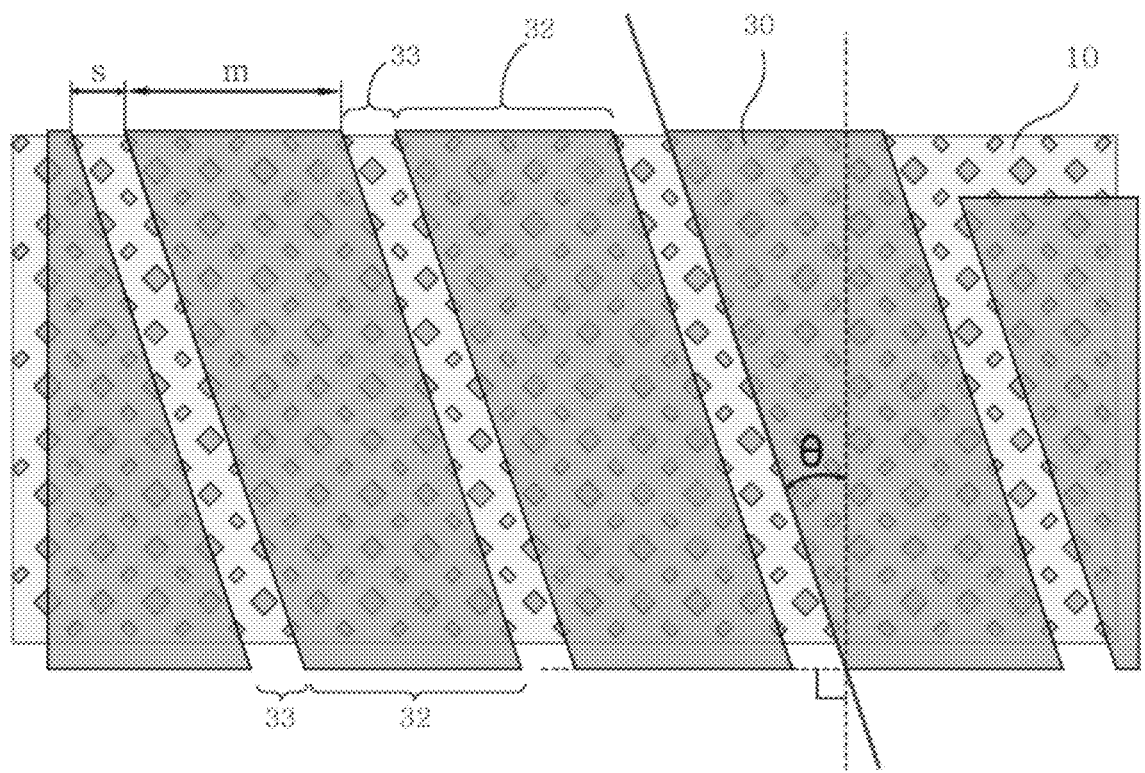
FIG. 9 is a view illustrating a configuration method of a parallax barrier applied to the RG-BG pentile panel according to an embodiment of the present invention.
Figure 10:
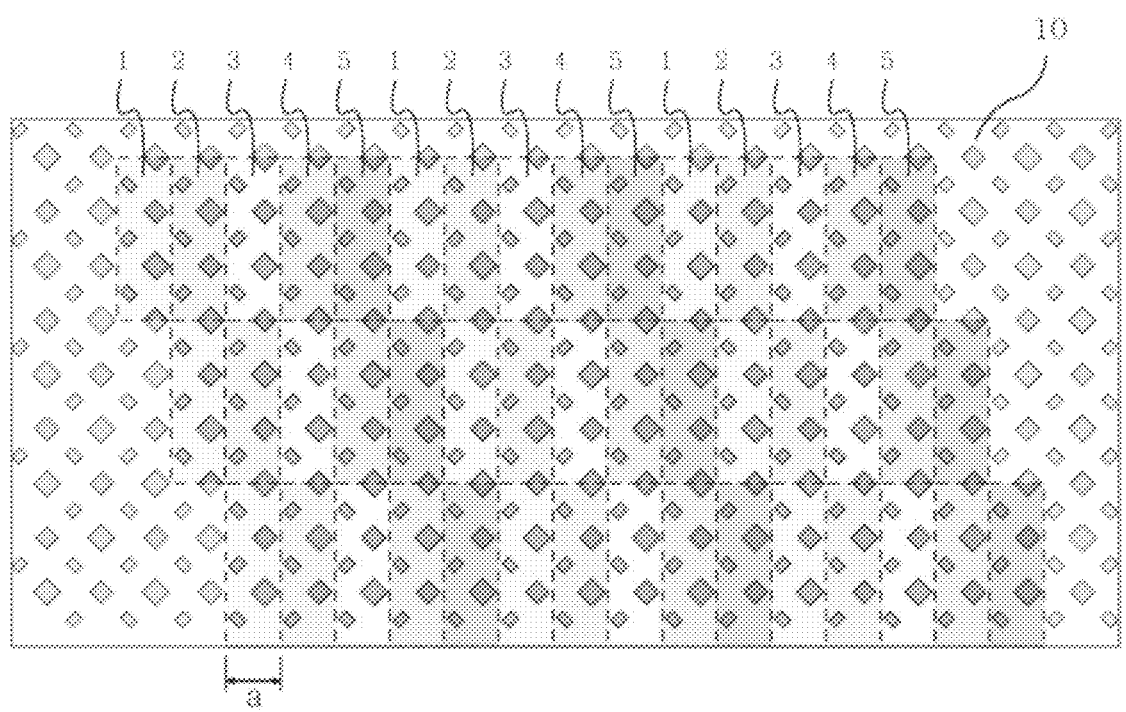
FIG. 10 is a view illustrating a three-dimensionally interlaced 5-viewpoint image displayed by being applied to the RG-BG pentile panel according to an embodiment of the present invention.

FIGS. 9 and 10 illustrate an embodiment of the present invention, and FIG. 10 illustrates that images captured from five multi-viewpoints applied to an RG-BG pentile type panel are interlaced (three-dimensionally), and the stereoscopic images are displayed on the screen of the panel.

As illustrated in FIG. 10, the five multi-view images are made according to the 3D interlacing arrangement, and the arrangement method may be varied according to the user's intention.

However, based on the horizontal arrangement, the multi-view images are sequentially arranged in one pixel unit to form one set (five-image arrangement), and therefore, a repetitive pattern in one set unit is displayed on the entire screen display panel.

Therefore, the parallax barrier layer 30 basically has a structure corresponding to the interlacing (3D interlacing) arrangement illustrated in FIG. 10, and is manufactured within a range satisfying the 'Equation 1' to 'Equation 3'. As illustrated in FIG. 9, the display layer 10 at the lower end is seen through the slit 33 of the parallax barrier layer 30.

However, there is another problem to be checked by the user. That is, the minimum number of multi-viewpoints capable of recognizing the stereoscopic images with both eyes has been already determined according to the resolution and viewing distance of the display device. In particular, in the case of a small display that a user holds with hand to watch, the viewing distance range is fixed, so the number of multi-views cannot be reduced or increased unconditionally. In the end, stereoscopic images should be produced with more than the minimum number of 'multi-viewpoints' required according to the viewing distance.

Figure 11:
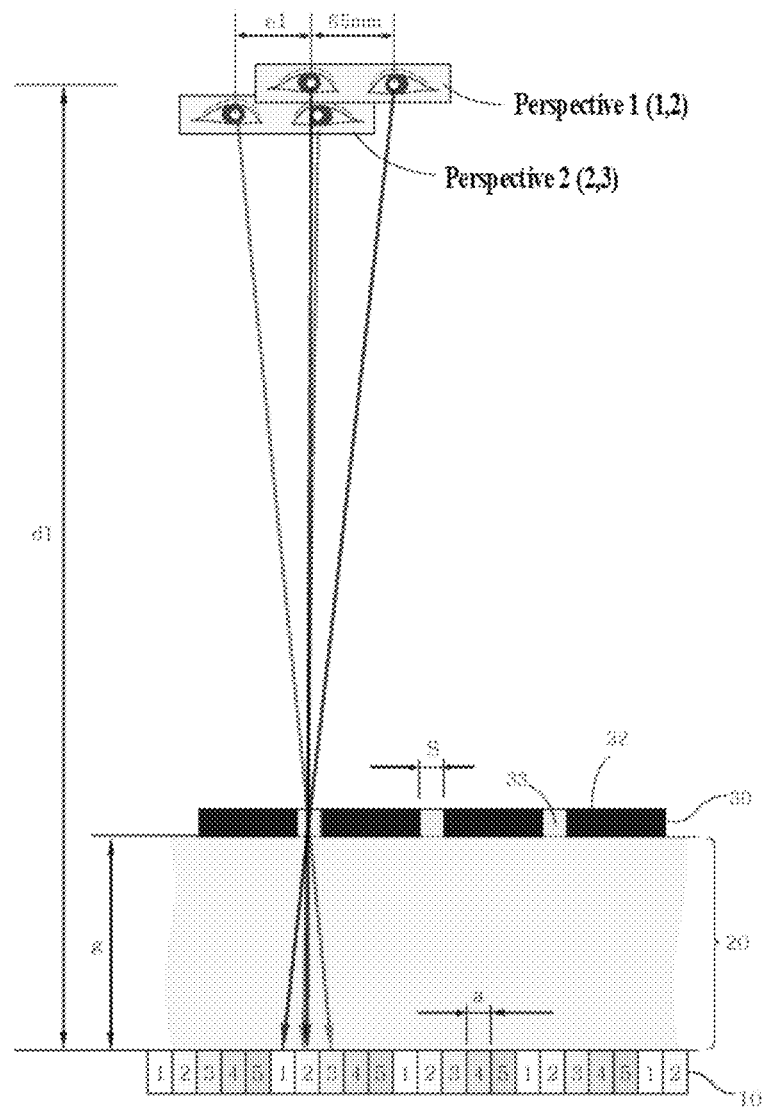
FIG. 11 is a view illustrating multi-view image observation by a long-distance perspective according to an embodiment of the present invention.
Figure 13:
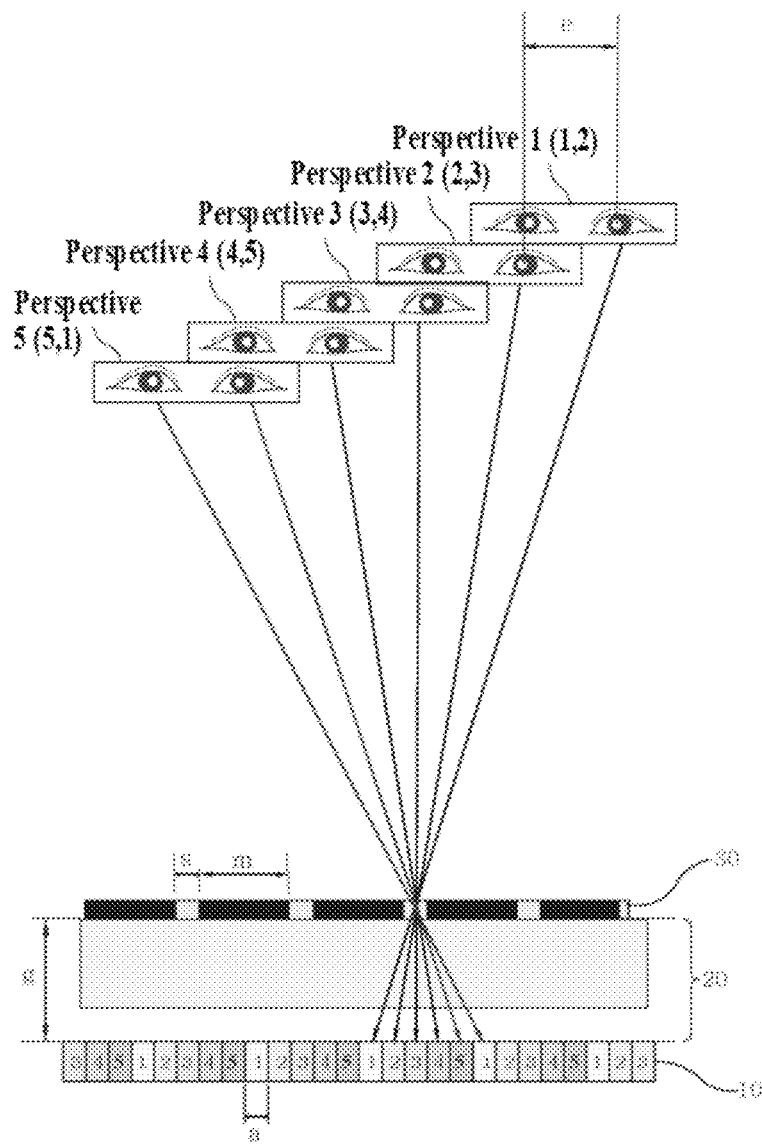
FIG. 13 is a view illustrating perspective observation of five multi-view images according to an embodiment of the present invention.

Therefore, FIGS. 11 and 13 show examples for explaining and solving these problems.

Figure 12:
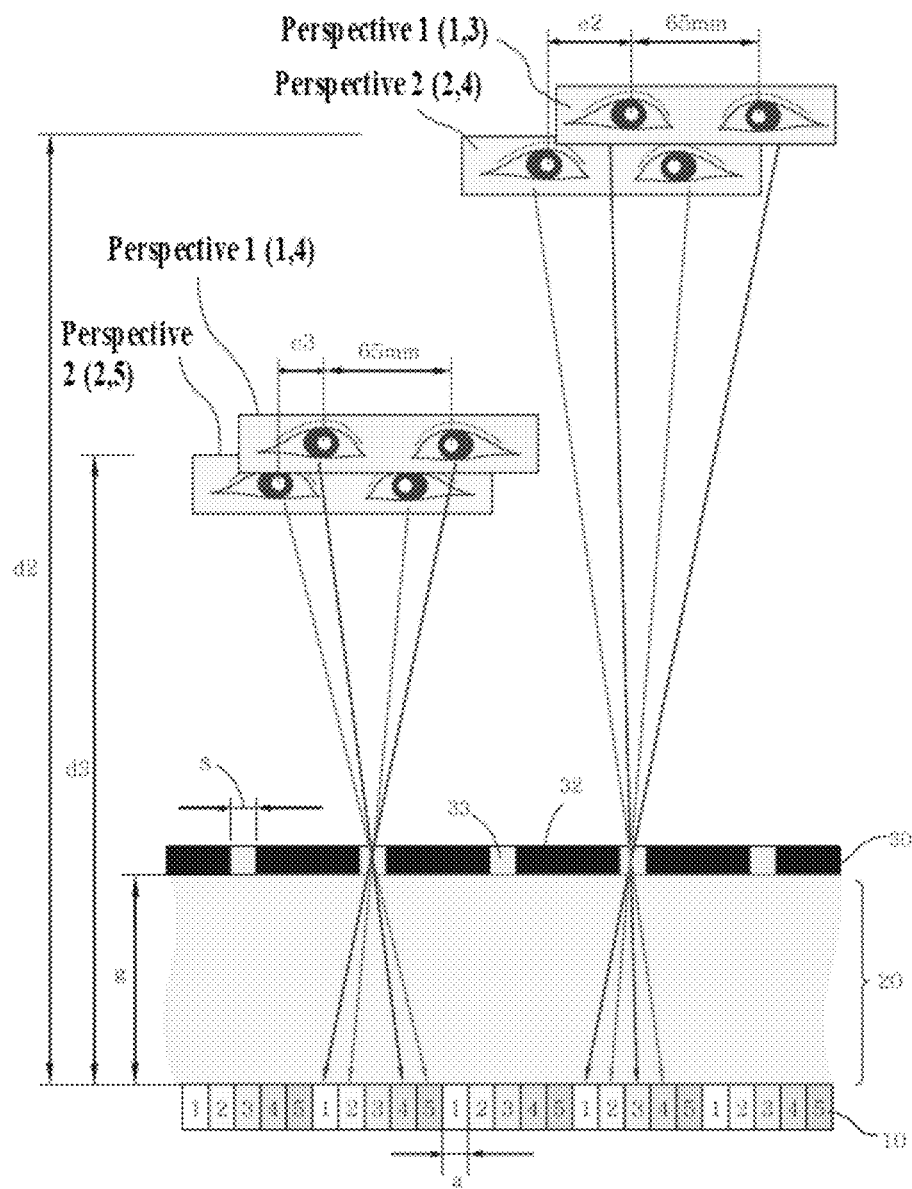
FIG. 12 is a comparative view illustrating multi-view image observation by a short-distance perspective according to an embodiment of the present invention.

FIG. 11 illustrates observation at a relatively long perspective distance 'd1', and FIG. 12 illustrates observation of a stereoscopic image at at a relatively short perspective distance 'd3' and at an intermediate perspective distance 'd2'. In addition, the drawings show viewing of five multi-view images, and illustrate an example when the distance (g)

of the transparent layer and the size of the 'one pixel unit element' of the display are applied in the same way.

The distance between the two eyes (pupils) of a person is about 65 mm, and the images viewed by the left and right eyes are combined in the brain to be recognized in three dimensions. Therefore, the range of observation with both eyes varies according to the viewing distance.

However, as illustrated in FIG. 13, in order to observe a stereoscopic image, conditions for stereoscopic perspective by sequential viewing observation are required. That is, if the right eye sees a No. 1 image and the left eye sees a No. 2 image at the perspective point 1 where a person sees with both eyes, the right eye sees the No. 2 image and the left eye sees a No. 3 image at the perspective point 2, which is an interval (e) location that the person's head (both eyes) is slightly moved to the left. Therefore, the left eye and the right eye can recognize the stereoscopic image only when seeing from sequential perspective points.

Subsequently, with respect to the sequential perspective observation to see at the the perspective point 3 and the the perspective point 4, the right eye sees a No. 5 image and the left eye sees the No. 1 image when seeing at the the perspective point 5, so the person may feel dizziness since the brain cannot recognize the stereoscopic image.

If the brain cannot combine the image viewed by the left eye and the right eye, the person cannot feel a stereoscopic sense at the perspective point 5, and the perspective point 5 becomes a location that the person recognizes dizziness. The dizziness at the point is called 'jump phenomenon'.

Therefore, as shown in the following 'Table 2' to 'Table 4', it is illustrated that the stereoscopic recognition state is varied according to the location of the perspective point and the viewpoints capable of stereoscopic perception are compared and exemplified.

Table 2 shows the viewing conditions from the location 'd1' which is a relatively far perspective position.

TABLE 2

| Viewing location of both eyes | Image viewed by right eye | Image viewed by left eye | Stereoscopic recognition state |
|---|---|---|---|
| Perspective point 1 | 1 | 2 | Possible |
| Perspective point 2 | 2 | 3 | Possible |
| Perspective point 3 | 3 | 4 | Possible |
| Perspective point 4 | 4 | 5 | Possible |
| Perspective point 5 | 5 | 1 | Impossible (jump) |
| Perspective point 1 | 1 | 2 | Possible |

As shown in Table 2 and FIG. 11, a movement distance is formed between a line of sight viewing the perspective point 1 and the perspective point 2 and a line of sight that one eye (left eye) sees the No. 2 image at the perspective point 1 and the other eye (left eye) sees the No. 3 image at the perspective point 2, and a movement width 'e1' of the line of sight from the No. 2 image to the No. 3 image is determined. Therefore, the movement width 'e1' is formed when the sight width of the two eyes is within 65 mm, and as shown in the 'Table 2', among total five perspective points there are total four viewpoints capable of viewing three-dimensionally with both eyes.

Table 3 shows the viewing conditions from the location 'd2' which is a relatively intermediate distance.

TABLE 3

| Viewing location of both eyes | Image viewed by right eye | Image viewed by left eye | Stereoscopic recognition state |
|---|---|---|---|
| Perspective point 1 | 1 | 3 | Possible |
| Perspective point 2 | 2 | 4 | Possible |
| Perspective point 3 | 3 | 5 | Possible |
| Perspective point 4 | 4 | 1 | Impossible (jump) |
| Perspective point 5 | 5 | 2 | Impossible (jump) |
| Perspective point 1 | 1 | 3 | Possible |

As shown in Table 3 and FIG. 12, in observation at the perspective point 1 and the perspective point 2, a movement width 'e2' between the line of sight at a viewpoint that the left eye sees the No. 3 image and the line of sight at a viewpoint that the left eye sees the No. 4 image is determined. The line of sight at the perspective point 1 where the user sees with both eyes views the No. 1 image and the No. 3 image. Accordingly, since the sight width of the two eyes is within 65 mm, among total five perspective points, there are total three viewpoints capable of viewing three-dimensionally with both eyes.

Table 4 shows the viewing conditions from the location 'd2' which is a short distance.

TABLE 3

| Viewing location of both eyes | Image viewed by right eye | Image viewed by left eye | Stereoscopic recognition state |
|---|---|---|---|
| Perspective point 1 | 1 | 4 | Possible |
| Perspective point 2 | 2 | 5 | Possible |
| Perspective point 3 | 3 | 1 | Impossible (jump) |
| Perspective point 4 | 4 | 2 | Impossible (jump) |
| Perspective point 5 | 5 | 3 | Impossible (jump) |
| Perspective point 1 | 1 | 4 | Possible |

As shown in Table 4 and FIG. 12, in observation at the perspective point 1 and the perspective point 2, a movement width 'e3' between the line of sight at a viewpoint that the left eye sees the No. 4 image and the line of sight at a viewpoint that the left eye sees the No. 5 image is determined. The line of sight at the perspective point 1 where the user sees with both eyes views the No. 1 image and the No. 4 image. Accordingly, since the sight width of the two eyes is within 65 mm, among total five perspective points, there are total two viewpoints capable of viewing three-dimensionally with both eyes.

Therefore, an equation to obtain the movement width 'e' of the line of sight on the basis of the accurate values in FIG. 6 and Table 1, and obtain the minimum number 'q' of multi-viewpoints required for stereoscopic observation is as follows:

through $a/g = e/(d-g)$, $e = (d-g)a/g$, and $q \approx 65 \text{ mm}/e$.  Equation 4

Here, 'd' is a distance from the display element and a human eye.
  'g' is a gap distance between the display element to the 'parallax barrier',
  'a' is ½ A horizontal pitch of the R(red) element forming one pixel unit in an image,
  'e' is a width of the horizontal view field that can see through compared to the size of one unit element (based on one eye), and 'q' is the minimum required number of multi-viewpoints for stereoscopic observation (rounding up to the nearest decimal point).

Therefore, assuming that a child sees a mobile phone at a viewing distance (d) of 290 mm, since the movement width (e) of the line of sight between the No. 1 image and the No. 2 image is about 16.2 mm, it is obtained that 65/16.2=4.0123, and the sight width of the two eyes is within 65 mm. So, intervals of at least five 'pixel unit elements' are needed. Finally, at least five or more multi-view images interlaced into three-dimensional images must be displayed on the display.

Table 5 shows comparison of minimum required number (N3) of multi-viewpoints capable of stereoscopic observation according to measurement distances.

TABLE 5

(Unit: mm)

| d = perspective distance | g = transparent layer distance | a = pitch of G element | S = slit width | E = One eye viewing field width | Q = minimum required number (N3) of multi-viewpoints for 3D image |
|---|---|---|---|---|---|
| 290 | 1.15 | 0.0645 | 0.064244224 | 16.20071739 | 5 or more |
| 300 |  |  | 0.06425275 | 16.76158696 | 4 or more |
| 390 |  |  | 0.064309808 | 21.80941304 | 3 or more |
| 430 |  |  | 0.0643275 | 24.0528913 | 3 or more |
| 600 |  |  | 0.064376375 | 33.58767391 | 2 or more |
| 700 |  |  | 0.064394036 | 39.19636957 | 2 or more |

Therefore, through the 'Table 5', it can be found that the minimum number of multi-viewpoints is increased as the user sees stereoscopic images at a short distance since the interval between the two eyes is about 65 mm.

Finally, as shown in the 'Table 5', if the viewing distance (d) is 390 mm or less, the minimum number of unit pixel elements viewed through the slit 33 with both eyes is required.

Since 65/21.806(e)=2.98, at least three unit pixel elements are needed.

Since 21.806(e)×3(q)=65.418 and 65.418−65=0.418, the marginal width of the head movement for stereoscopic viewing is only 0.418 mm, considering the above conditions, the minimum required number (q) of multi-viewpoints for stereoscopic observation is preferably more than the above.

Therefore, it is proved that at least five multi-view images for stereoscopic recognition must be produced at the viewing distance of about 25 cm to 80 cm, which is the main perspective distance for viewing mobile phones. If the display is composed of higher resolution pixel unit elements, it can be seen from the calculation formula that more and more multi-viewpoint images are required.

Even if there are five multi-view images actually captured during the interlacing process, interference images causing dizziness can be removed by increasing the number of multi-viewpoints, and it can be made by adding an α image of the present invention to the arrangement of the interlaced images.

Referring to FIG. 6, the α image is displayed on the display layer 10. The α image is arranged next to the Nos. 1 to 5 images. The α image may be a monochromatic image, a translucent image, a gradation image, or a copy image of the captured image. In addition, the copy image of the captured image may mainly utilize the first image or the final image at each viewpoint.

Therefore, referring to the perspective conditions of 'FIG. 13' and 'Table 2', a user sees the jump phenomenon that the user feels dizzy at a specific position when observing a stereoscopic image at the 'perspective point 5' of FIG. 13. However, if the α image is added between the No. 5 image and the No. 1 image, the user may recognize the image naturally without dizziness. Furthermore, the addition of the α image may help to secure more multi-view images even by less multi-view photographed images.

'Table 6' shows results when a white α image is applied to the embodiment of the present invention.

TABLE 6

| Viewing location of both eyes | Image viewed by right eye | Image viewed by left eye | Stereoscopic recognition state |
|---|---|---|---|
| Perspective point 1 | 1 | 2 | 3D recognized |
| Perspective point 2 | 2 | 3 | 3D recognized |
| Perspective point 3 | 3 | 4 | 3D recognized |
| Perspective point 4 | 4 | 5 | 3D recognized |
| Perspective point 5 | 5 | α | 2D recognized Translucent No. 5 image (not dizzy) |
| Perspective point 6 | α | 1 | 2D recognized Translucent No. 1 image (not dizzy) |
| Perspective point 1 | 1 | 2 | 3D recognized |

Therefore, stereoscopic viewing is possible in the range from the 'perspective point 1' to the 'perspective point 4'. At the 'perspective point 5', the right eye sees the No. 5 image and the left eye sees the 'white image', so the brain combines the 'No. 5 image' and the 'white image' so that the user recognizes the image blur. Additionally, at the 'perspective point 6', the right eye sees the 'white image' and the left eye sees the 'No. 1 image', so the user can see the image without dizziness.

Finally, the user determines the position where stereoscopic viewing is possible between the perspective point 1 and the perspective point 6. In particular, in the case of hand-held mobile phone display devices, the human brain subconsciously adjusts the appropriate position (angle) for stereoscopic viewing so that the user can see stereoscopic images.

In addition, the 'α' image can be added and interlaced at two or more viewpoints according to the user's intention. Namely, it is possible to make five-viewpoint images into seven-viewpoint images in the order of α & 1, 1 & 2, 3 & 4, 4 & 5, 5 & α, and α & α. It is possible to make seven or more multi-view images, but as mentioned above, the resolution of the image viewed through the slit 33 seems to be poor. So, it would be desirable to use it appropriately.

FIG. 14 is an enlarged view of a 'simulation' of a situation when a user sees small letters with naked eyes in stereoscopic vision.

The parallax barrier stereoscopic imaging technique separately has a display resolution and a 'stereoscopic display resolution' to recognize stereoscopic images. That is, small elements of the display panel guarantee clear image quality when viewing two-dimensional images with naked eyes, but the 'stereoscopic display resolution' to recognize stereoscopic images may be varied according to the user's intention regardless of resolution of the display panel element, and may be varied according to the number of multi-viewpoints, a pattern angle of the parallax barrier, and the size of the display element.

The 'stereoscopic display resolution' is composed of the size of one 'stereoscopic image display pixel', which is 'number of multi-viewpoints'×'size of one pixel element'. Accordingly, the more the number of multi-viewpoints (images), the lower the stereoscopic display resolution. In addition, small things, letters, or the likes viewed with naked eyes are seen unnaturally depending on the pattern angle of the parallax barrier and the interlaced pattern configuration, and it is shown in FIG. 14.

In order to be seen naturally, for example, it is preferable to minimize the phenomenon that letters are seen saw-toothed according to the interval and slope of the slit 33. In the drawing, parallax barrier (slit angle)/(number of multi-viewpoints) is specified in the left column, and images to each of which the numerical values are applied are shown in the right column. In the uppermost column, the original image is displayed, and the numerical values are respectively applied to the original image.

In the lowermost column, the 'vertical/six viewpoints' image in the form of a letter is shown. However, since the color change moire is the most severe when the slit angle is vertical, the angle is not applicable, and is just a numerical value applied for comparison. The remaining images have angles that do not cause the color change moire, in which the letters are expressed roughly like saw-teeth and seem to have different thicknesses since the images are expanded. However, they will be seen in a less unnatural way when viewed with naked eyes.

Therefore, as mentioned above, it can be confirmed that the image expressed by '26.565 degrees/five viewpoints' looks the most natural because at least four or more multi-viewpoints are required for short-distance perspective. A person who observes with naked eyes at a short distance can recognize an object having the minimum size up to about 0.1 mm, but existing computer monitors have a pixel size of about 0.3 mm. So, it is preferable that the size of one 'stereoscopic image display pixel' is 0.4 mm or less as a pitch which is the minimum 'required number of multi-viewpoints' or more. Therefore, the pitch of the parallax barrier repeated pattern must be made within 0.4 mm.

Figure 15:
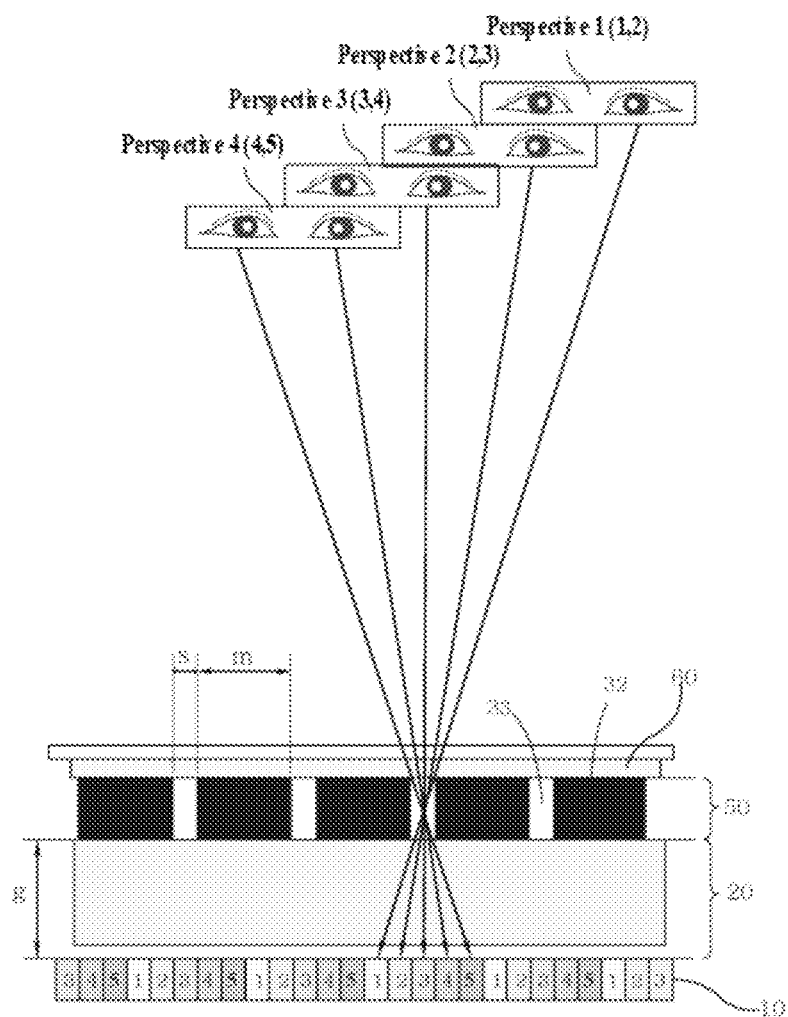
FIG. 15 is a view illustrating a configuration of a switchable parallax barrier of a stereoscopic image display device according to another embodiment of the present invention.

FIG. 15 is a view illustrating that a mask area of the parallax barrier is a 'switchable barrier' as another embodiment of the present invention.

The switchable parallax barrier is to manufacture the mask area 32 to block or transmit light by an electric signal since the entire area or the area of the mask 32 forming the parallax barrier is made of liquid crystal.

A liquid crystal parallax barrier layer 50 is formed on the display layer 10 (OLED or LCD), and is made of a liquid crystal material capable of controlling the alignment surface of display cells.

Therefore, there is an advantage that the perspective screen can be automatically converted so that the user can selectively view two-dimensional images and three-dimensional images.

The biggest advantage of the switchable parallax barrier is that it is automatically converted and controlled so that a user can selectively view two-dimensional images and three-dimensional images. For instance, in a case in which the parallax barrier is formed in a film type, a complicated process of mounting or removing a parallax barrier device on a mobile phone to selectively view two-dimensional images and three-dimensional images is required.

Therefore, the present invention proposes a method which is not applicable to the conventional arts. An interlaced image is divided and displayed on the complex pentile display layer, and the slits 33 and the mask area 32 corresponding to the pattern area of the displayed element are divided and arranged, so the 'switchable parallax barrier layer 60' which does not generate the moire phenomenon within an application range satisfying the 'Equation' can be manufactured.

Figure 16:
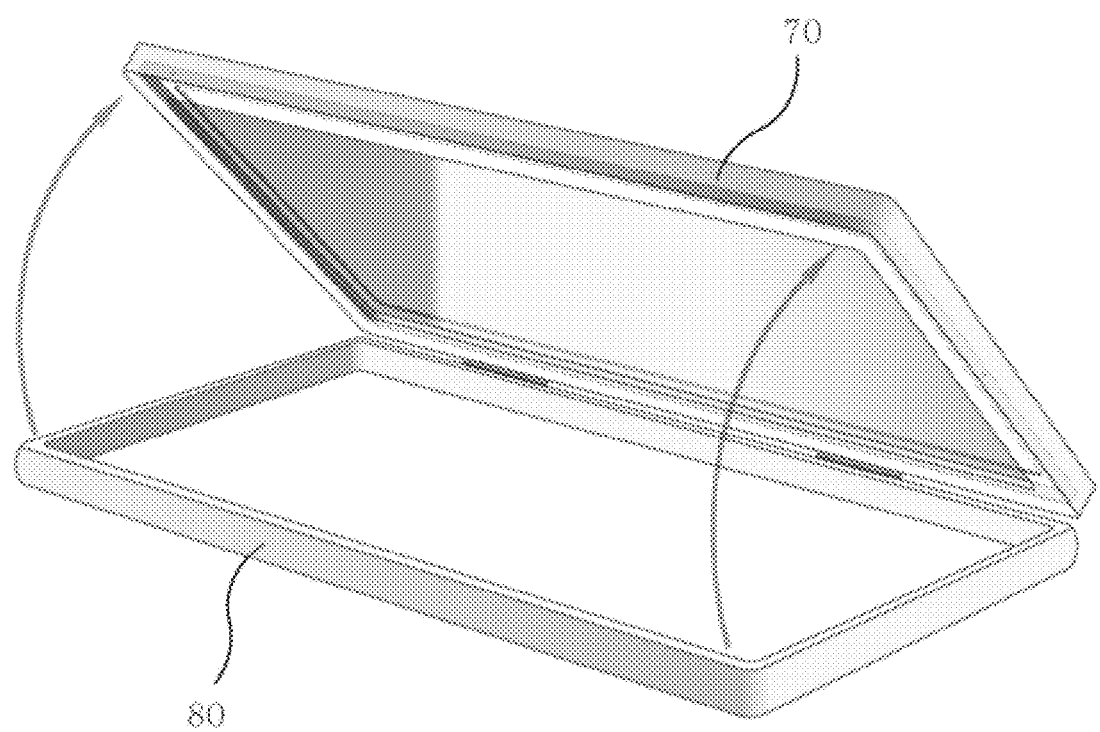
FIG. 16 is a perspective view illustrating a state in which a parallax barrier layer is applied to a mobile phone case according to a further embodiment of the present invention.
Figure 17:
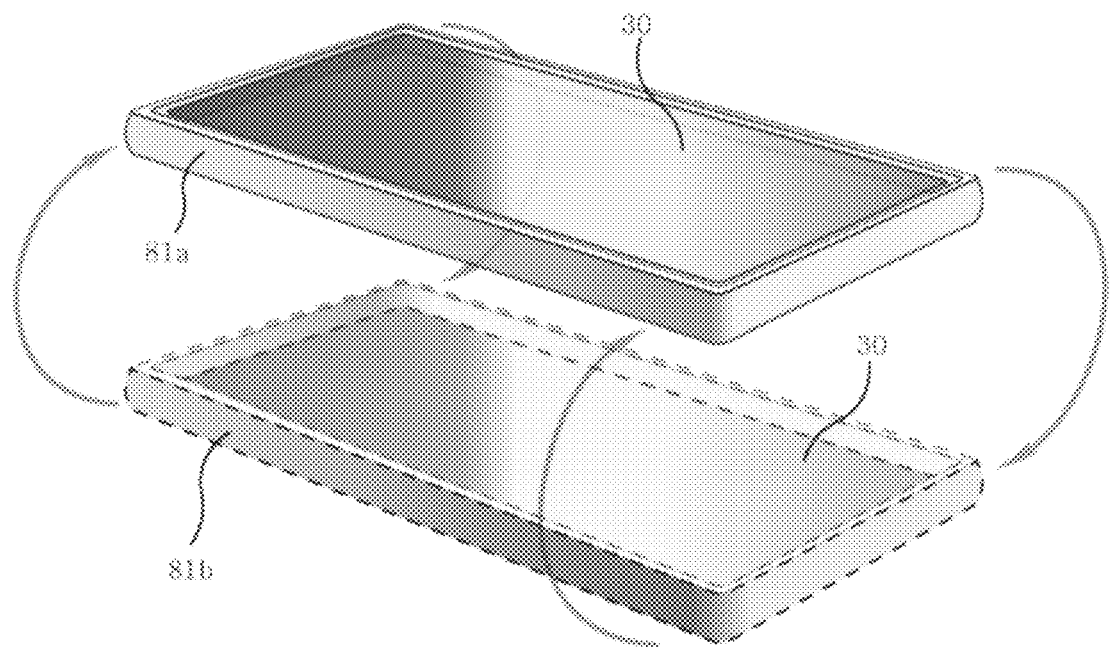
FIG. 17 is a view illustrating a structure that a parallax barrier film is mounted on one surface of the mobile phone case.

FIGS. 16 and 17 illustrate that a parallax barrier layer is applied to a mobile phone case as another embodiment of the present invention.

In order to watch stereoscopic images on a mobile phone, the user must mount the parallax barrier on the top of the screen of the mobile phone. To this end, the parallax barrier can be manufactured by mounting on the mobile phone case and inserting the barrier layer 30.

As illustrated in FIG. 16, the mobile phone case is divided into an upper frame 70 and a lower frame 80, and the upper frame 70 and the lower frame 80 are coupled to each other. The upper frame 70 and the lower frame 80 can be coupled to each other or separated from each other by using a hinge or a magnet, but the coupling method is not limited thereto.

The parallax barrier applied to the pentile display is made of a film material and can be manufactured by printing, photoresist exposure phenomenon, etc. The parallax barrier film has a structure coupled to the upper frame 70 of the mobile phone case, and is manufactured to be able to adjust the position of the film. The lower frame 80 designed to cover the side or the back surface of the mobile phone has a structure that the parallax barrier film 30 is put on the upper glass of the mobile phone display while being coupled with the upper frame 70.

FIG. 17 illustrates a structure that the parallax barrier film is mounted on one surface of the mobile phone case.

In order to see stereoscopic images, the parallax barrier film must be put on the mobile phone screen. So, the mobile phone case 81b is usually fit on the mobile phone in such a way that the parallax barrier film faces the lower side, but in order to see through stereoscopic images, the mobile phone case 81a is turned upside down so that the parallax barrier film faces the upper side. When the mobile phone case is fit to the mobile phone, the parallax barrier film is put on the mobile phone screen, so that the user can see stereoscopic images by using the mobile phone case.

Therefore, even though mobile phone manufacturers do not release mobile phones on each of which the parallax barrier is mounted, the user can see stereoscopic images using his or her mobile phone after downloading stereoscopic images at any time.

In the above, the technical idea of the present invention has been described together with the accompanying drawings, but it is to exemplarily describe embodiments of the present invention, not limiting the present invention. It will be understood by those of ordinary skill in the art that various changes, modifications, and equivalents may be made therein without departing from the technical idea and scope of the present invention, and such changes, modifications, and equivalents belong to the scope of the technical idea of the present invention.

What is claimed is:

1. A stereoscopic display device comprising:
a display layer for displaying multi-view images having at least three viewpoints into stereoscopic images;
a transparent layer arranged on one side of the display layer; and
a parallax barrier layer arranged on one side of the transparent layer and including a light blocking part for blocking light and a slit for transmitting the light,
wherein the stereoscopic images displayed on the display layer are sets of the multi-view images repeatedly arranged, and each of the sets of the multi-view images has at least one 2-dimensionally (2D) recognized α image to reduce dizziness of a viewer,
wherein a horizontal interval of the slit of the parallax barrier layer satisfies the following Equation 1:

$$S = a[(d-g)/d],  \qquad \text{<Equation 1>}$$

wherein in the Equation 1, d is a distance from the display layer to a human eye, g is a distance between the display layer and the parallax barrier, a is ½ horizontal pitch of an R (red) element forming one pixel unit in the stereoscopic image, and S is the horizontal interval (width) of the slit of the parallax barrier layer.

2. A stereoscopic display device comprising:
a display layer for displaying multi-view images having at least three viewpoints into stereoscopic images;
a transparent layer arranged on one side of the display layer; and
a parallax barrier layer arranged on one side of the transparent layer and including a light blocking part for blocking light and a slit for transmitting the light,
wherein the stereoscopic images displayed on the display layer are sets of the multi-view images repeatedly arranged, and each of the sets of the multi-view images has at least one 2-dimensionally (2D) recognized α image to reduce dizziness of a viewer,
wherein the number of multi-viewpoints of the multi-view image displayed on the display layer satisfies the following Equation 2:

$$e = a[(d-g)/g],  \qquad \text{<Equation 2>}$$

that is, q≈65 mm/e,
wherein in the Equation 2, d is a distance from the display layer and a human eye, g is a distance between the display layer and the parallax barrier, a is H horizontal pitch of an R element forming one pixel unit in the stereoscopic image, e is a width of a horizontal view field that can be seen through compared to the size of one unit element (based on one eye), and q is the required number of the multi-viewpoints (rounding up to the nearest decimal point).

3. A stereoscopic display device comprising:
a display layer for displaying multi-view images having at least three viewpoints into stereoscopic images;
a transparent layer arranged on one side of the display layer; and
a parallax barrier layer arranged on one side of the transparent layer and including a light blocking part for blocking light and a slit for transmitting the light,
wherein the stereoscopic images displayed on the display layer are sets of the multi-view images repeatedly arranged, and each of the sets of the multi-view images has at least one 2-dimensionally (2D) recognized α image to reduce dizziness of a viewer,
wherein a pixel structure of the display layer is an RG-BG (red, green-blue, green) pentile subpixel structure, an angle of the slit of the parallax barrier layer satisfies the following Equation 3:

$$\theta 1 = \arctan[a/(N1*b)]*180/\pi.  \qquad \text{<Equation 3>}$$

wherein in the Equation 3, θ1 means an angle between the slit and a line vertically connecting an RGB (red, green, blue) subpixels in a pixel arrangement of the display layer, a is ½ horizontal pitch of an R element forming one pixel unit in the stereoscopic image, b is ½ vertical pitch of the R element forming the one pixel unit of the stereoscopic image, and N1 is a natural number of 2 or more, namely, an integer less than or equal to the number of multi-points.

4. A stereoscopic display device comprising:
a display layer for displaying multi-view images having at least three viewpoints into stereoscopic images;
a transparent layer arranged on one side of the display layer; and
a parallax barrier layer arranged on one side of the transparent layer and including a light blocking part for blocking light and a slit for transmitting the light,
wherein the stereoscopic images displayed on the display layer are sets of the multi-view images repeatedly arranged, and each of the sets of the multi-view images has at least one 2-dimensionally (2D) recognized α image to reduce dizziness of a viewer,
wherein in a case in which a pixel structure of the display layer is an RG-BW (red, green-blue, white) pentile subpixel structure, an angle of the slit of the parallax barrier layer satisfies the following Equation 4:

$$\theta 2 = \arctan[a/(2N2*b)]*180/\pi,  \qquad \text{<Equation 4>}$$

wherein in the Equation 4, θ1 means an angle between the slit and a line vertically connecting an RGB subpixels in a pixel arrangement of the display layer, a is ½ horizontal pitch of an R element forming one pixel unit in the stereoscopic image, b is ½ vertical pitch of the R element forming the one pixel unit of the stereoscopic image, and N2 is a natural number of 2 or more, namely, an integer less than or equal to the number of multi-points.

5. The stereoscopic display device according to claim 1, wherein the parallax barrier layer includes a switchable parallax barrier which is switched into the light blocking part and the slit depending on an electric signal.

6. The stereoscopic display device according to claim 1, wherein the 2D recognized α image is one among a monochromatic image, a translucent image, a gradation image, and an image adjacent to the sets of the multi-view images.

* * * * *